United States Patent [19]

Dong et al.

[11] 4,019,536
[45] Apr. 26, 1977

[54] SWING SPOUT FAUCET

[76] Inventors: Poy Dong, 70 Louise St., Newton, Mass. 02158; James P. Fahey, 34 Powder House Blvd., Somerville, Mass. 02143

[22] Filed: Oct. 1, 1975

[21] Appl. No.: 618,391

[52] U.S. Cl. .................. 137/625.41; 137/616.7; 251/352
[51] Int. Cl.² .................................. F16K 11/087
[58] Field of Search .............. 137/625.41, 625.17, 137/597, 624.12, 616.7; 251/352

[56] References Cited

UNITED STATES PATENTS

| | | | |
|---|---|---|---|
| 3,169,549 | 2/1965 | Quick | 137/625.41 X |
| 3,530,889 | 9/1970 | Spencer | 137/625.41 X |
| 3,831,630 | 8/1974 | McGavin | 137/625.41 X |

Primary Examiner—Arnold Rosenthal
Attorney, Agent, or Firm—Joseph S. Iandiorio

[57] ABSTRACT

A faucet including a spout with a longitudinal duct, a housing, a recess in said housing for rotatably receiving the inner end of the spout; the spout being rotatable between at least two positions, a first position and a second position, a transverse duct in the spout proximate the inner end of the spout and communicating with the duct longitudinal of the spout; a bore in the housing for connection with a fluid source extending to the recess and the inner end of the spout; an adjustable sealing member in the bore; and a passage extending through the adjustable sealing member to the recess for communicating with the transverse duct in the first position and not in the second position.

9 Claims, 9 Drawing Figures

SWING SPOUT FAUCET

FIELD OF INVENTION

This invention relates to a swing spout faucet and to a swing spout mixer faucet.

BACKGROUND OF INVENTION

Swing spout faucets are often used in kitchens where oriental foods are prepared. In such environments they are often referred to as "chop-suey" faucets because of their particular suitability for the pans used in preparing chop suey. In such applications they are close to hot or boiling fats and oils. In one currently available swing spout faucet the rotatable plug portion of the spout and the housing in which it fits are tapered and held in place by a nut engaged with a thread on the bottom of the plug. However, sediment and contaminants in the water soon wear away at the contacting surfaces and in a very short time water leaks out the top and the bottom of the faucet. In particularly bad cases the water actually squirts out the top in thin streams which can be hazardous in an area where hot fats and oils are present. Another currently available type of swing spout faucet uses a cam operated spring loaded valve in which the cam is driven by the rotatable spout assembly. These types, too, suffer from the need for early and frequent maintenance: the cam wears, the spring rusts, the valve and seat corrode and wear. Typically, the simple swing spout faucets are made for a single connection, either hot or cold. Those swing spout faucets which are designed for mixing are typically quite complex and costly.

SUMMARY OF INVENTION

It is therefore an object of this invention to provide a simple, reliable, inexpensive and leakproof swing spout faucet which requires a minimum of servicing and yet remains reliably leakproof for extended periods of use.

It is a further object of this invention to provide such a faucet in which any leak which might occur even after extended periods of use may be stopped by a simple adjustment.

It is a further object of this invention to provide such a faucet in which the primary sealing arrangement in the valving area of the faucet acts to exclude dirt from the region of the seal.

It is a further object of this invention to provide such a faucet in which a secondary seal prevents escape of fluid from the faucet even if leakage has occurred in the valving area of the faucet.

It is a further object of this invention to provide such a faucet which may be made as a mixer faucet.

The invention features a faucet having a spout, housing, and a recess in the housing for rotatably receiving the inner end of the spout and communicating with the longitudinal duct of the spout. A bore in the housing is provided for connection with a fluid source at one end and extends to the recess in the inner end of the spout. An adjustable sealing member is located in the bore and a passage extends through the adjustable sealing member to the recess for communicating with the transverse duct in the first position and not in the second position.

In another embodiment, a second set of the adjustable sealing member, passage, transverse duct and bore may be provided for operation as a mixer faucet. In preferred embodiments, the adjustable sealing member includes an adjustable element and a sealing element located between the adjustable element and the spout. The sealing element engages with the spout to sealingly connect the passage with the transverse duct. The bore may include internal threads and the adjustable sealing member may include external threads engageable with the internal threads for adjusting the position of the adjustable sealing member in the bore.

DISCLOSURE OF PREFERRED EMBODIMENT

Other objects, features and advantages will occur from the following description of a preferred embodiment and the accompanying drawings, in which.

The invention may be accomplished using a faucet having a spout, a housing and a recess in the housing for rotatably receiving the inner end of the spout. The spout is rotatable between at least two positions; a first position in which the faucet is open and a second position in which the faucet is closed. There is a transverse duct in the spout which is in the area of the inner end of the spout within the recess and which communicates with the longitudinal duct of the spout. A bore in the housing extends to the recess in the inner end of the spout; the other end of the bore is adapted for connection with a fluid source, such as a water pipe. An adjustable sealing member, the primary sealing duct in the valving area, is located in the bore and there is a passage extending through the adjustable sealing member to the recess for communicating with the transverse duct in the first position when the faucet is open but not in the second position when the faucet is closed.

The adjustable sealing member may include an adjustable element such as a screw through which runs a passage, on a central longitudinal axis and a sealing element which is disposed between the adjustable element and the spout and which is engageable with the spout to sealingly connect the passage through the screw with the transverse duct in the spout.

A pressure pad, which may be formed of a low friction material such as nylon or Teflon, may be installed in the recess on the opposite side from the sealing element to decrease the wear on the area of the spout opposite the sealing element. A secondary sealing member may be sealingly engaged with the spout and the recess. Typically, this secondary sealing member is located along the spout somewhere between the area of the transverse duct and the area where the spout leaves the recess. Thus, even if the primary sealing arrangement, i.e. the sealing element positioned by the adjustable member, begins to leak the secondary sealing element prevents the fluid from leaving the faucet body. Alternatively, the adjustable member part of the adjustable sealing member may include a camming member driven by a screw oriented transversely in said bore but nevertheless designed to provide a passage through which fluid can flow from the bore to the transverse duct.

Figure 1:
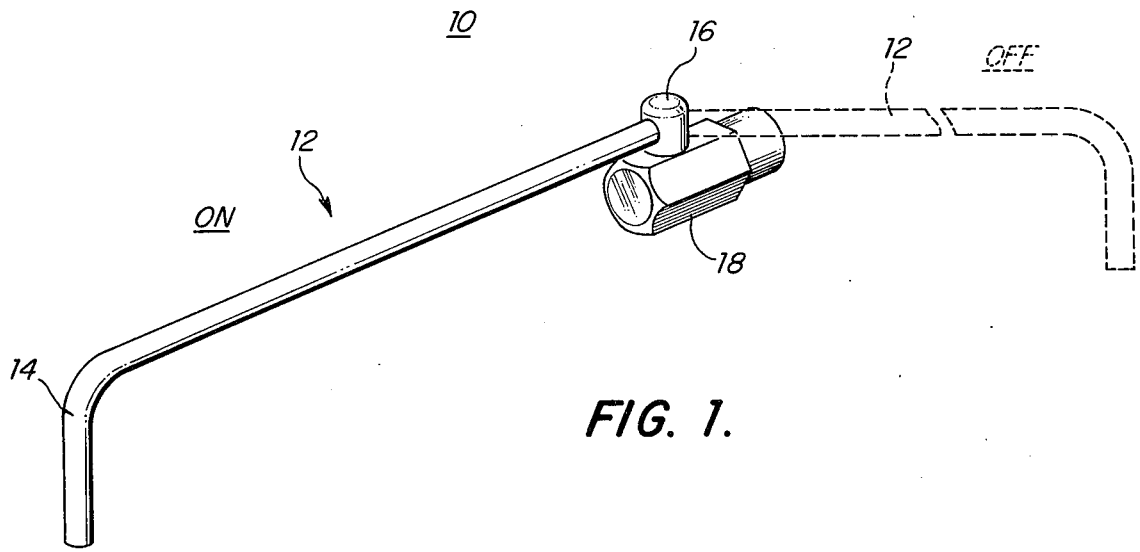
FIG. 1 is an axonometric view of a swing spout faucet in the on position according to this invention with the orientation of the spout in the off position, shown in phantom.

There is shown in FIG. 1 a swing spout operated faucet 10 including a spout 12 including neck 14 and body 16 rotatably mounted in housing 18. When spout 12 is in the position shown aligned with the longitudinal axis of housing 18 it is in the on position; when spout 12 is orthogonal to that position as shown, in phantom in FIG. 1, it is in the off condition. Neck 14, FIG. 2, of spout 12 is engaged by means of threads 20 with threads 22 in body 16 to form the longitudinal passage 24 constituted by the hole 26 in neck 14 and the hole 28 in body 16. Body 16 of spout 12 is rotatably received in recess 30 in housing 18. Internal threads 32 or other suitable connection means are provided at one end of housing 18 for connection to a source of fluid to be controlled such as a water pipe. Bore 24 contains internal threads 36 which engage with external threads 38 on adjustable member or screw 40. Screw 40 has a slot 42 in its top to receive a screwdriver or the like so that it may be adjusted and contains longitudinal passageway 44 which communicates with transverse duct 46 in body 16 of spout 12 which interconnects with longitudinal duct 24.

An annular, low friction sealing element 48 such as a nylon or Teflon ring is disposed between screw 40 and body 16 to sealingly interconnect the end of screw 40 with the area of body 16 surrounding transverse duct 46 to form the primary seal in the valving area of the faucet. Sealing element 48 and screw 40 together form an adjustable sealing element: after a long period of use when sealing element 48 begins to wear and slight leaks develop between it and either screw 40 or body 16, screw 40 may then be screwed in such as by a screwdriver in slot 42 to tighten slightly the contact between screw 40, seal 48 and body 16. A pressure pad 50 also made of a low friction material such as nylon or Teflon may be inserted in the wall of recess 30 opposite the area of contact of seal 48 in order to further reduce the wear on body 16.

Figure 2:
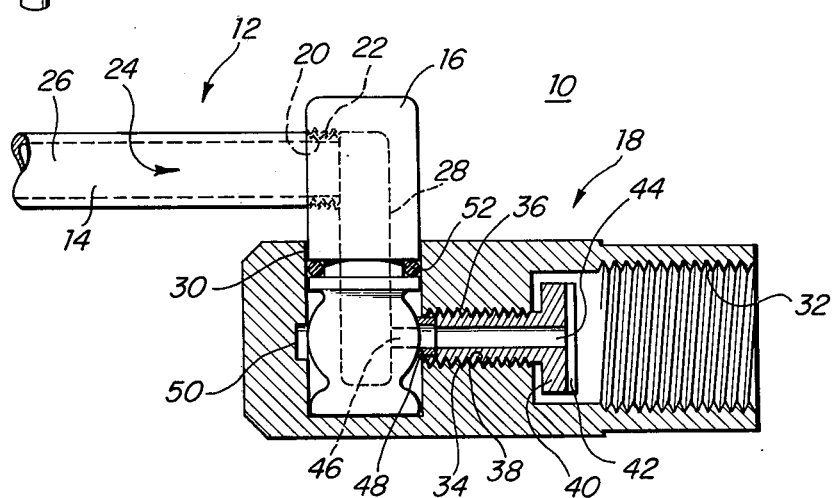
FIG. 2 is a side elevational view of a portion of the faucet shown in FIG. 1, with certain parts shown in section.

A secondary seal such as O-ring 52 may be carried by body 16 as shown in FIG. 2 or in a suitable channel in recess 30 for sealingly engaging body 16 with housing 18 somewhere between transverse duct 46 and the primary seal provided by sealing element 48 and the mouth of recess 30 where it surrounds body 16.

In operation, with spout 12 oriented as shown in FIGS. 1 and 2, the faucet valve is open and water admitted through connection member 32 will pass directly through passage 44, through sealing element 48 into transverse duct 46, through longitudinal duct 24 and out spout 14. In the closed position when transverse duct 46 is no longer aligned with sealing element 48 and passage 44 water flow is arrested at the blocking portion of body 16 and no water flows through duct 24.

Figure 3:
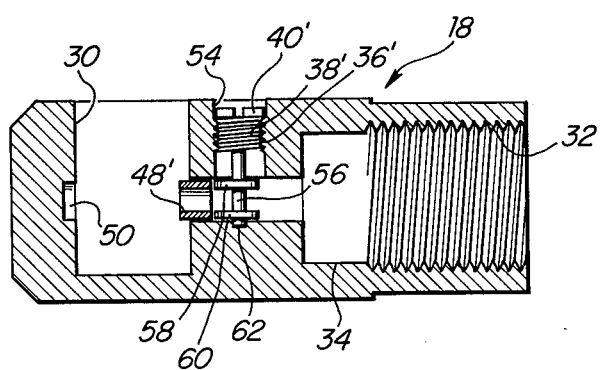
FIG. 3 is a side elevational view with portions shown in section of the faucet of FIG. 1 with the spout removed showing an alternative, adjustable sealing member.
Figure 4:
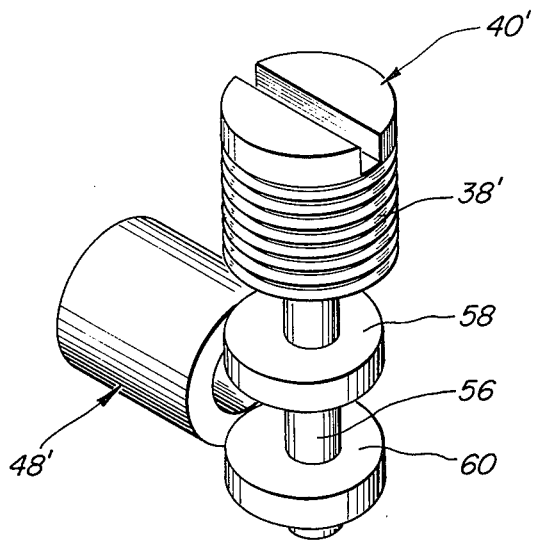
FIG. 4 is an exploded axonometric view of the sealing element and adjustable member which form the alternative adjustable sealing member illustrated in FIG. 3.

In an alternative embodiment as shown in FIGS. 3 and 4 where like parts have been given like numbers and similar parts like numbers primed, the adjustable sealing member includes sealing element 48' and adjustable member 40' which includes external screw threads 38' that engage with internal screw threads 36' in bore 54. The lower portion of member 40' includes a reduced shaft 56 fixed to which are a pair of cams 58 and 60 which bear on the upper and lower edges of annular sealing element 48'. The lower end of reduced section 56 extends slightly beyond cam 60 into a pilot hole 62 on the bottom of bore 34. Adjustment of sealing element 48' to prevent leakage and accommodate for wear of sealing element 48' is performed by rotating screw or member 40' in order to increase the force provided by cams 58 and 60 on sealing element 48' to drive it more tightly against body 16. Member 40 and sealing element 48' may be seen in greater detail in FIG. 4.

Figure 5:
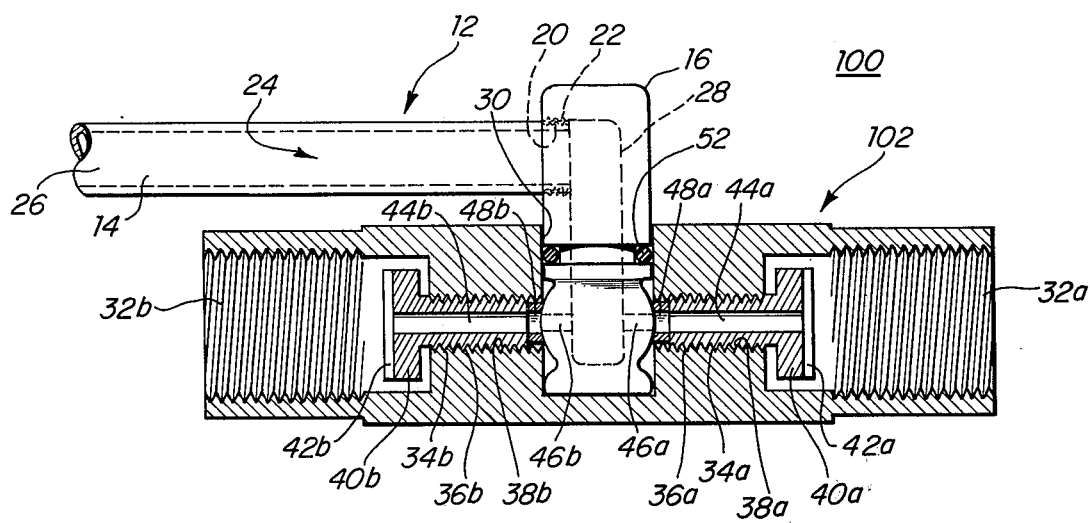
FIG. 5 is a side, elevational view of a portion of a swing spout mixer faucet according to this invention with certain parts shown in section.

A swing spout mixer faucet 100 is shown in FIG. 5 where like parts have been given like numbers and similar parts like numbers accompanied by a or b, with respect to FIG. 1. Swing spout mixer faucet 100 includes a spout 12 including neck 14 and body 16 rotatably mounted in housing 102. Neck 14 of spout 12 is engaged by means of threads 20 with threads 22 in body 16 to form the longitudinal passage 24 constituted by the hole 26 in neck 14 and the hole 28 in body 16. Body 16 of spout 12 is rotatably received in recess 30 in housing 102. Internal threads 32a or other suitable connection means are provided at one end of housing 102 for connection to a source of fluid to be controlled such as a water pipe. In this case connection 32a is adapted for connection to a cold water pipe. Bore 34a contains internal threads 36a which engage with external threads 38a on adjustable member or screw 40a. Screw 40a has a slot 42a in its top to receive a screwdriver or the like so that it may be adjusted and it contains longitudinal passageway 44a which communicates with transverse duct 46a in body 16. Annular low friction sealing element 48a is a nylon or Teflon ring which is disposed between screw 40a and body 16 to sealingly interconnect the end of screw 40a with the area of body 16 surrounding transverse duct 46a to form the primary seal in the valving area of the faucet. Sealing element 48a and screw 40a together form an adjustable sealing element: after a long period of use, when sealing element 48a begins to wear and slight leaks develop between it and either screw 40a or body 16a, screw 40a may then be screwed in using a screwdriver in slot 42a, to tighten slightly the contact between screw 40a, seal 48a, and body 16.

A second set of internal threads 32b are provided at the other end of housing 102 for connection to another source of fluid to be controlled, such as a hot water pipe. Bore 34b contains internal threads 36b which engage with external threads 38b on adjustable member or screw 40b. Screw 40b has a slot 42b in its end to receive a screwdriver or the like so that it may be adjusted and contains longitudinal passageway 44b which communicates with transverse duct 46b in body 16 of spout 12.

An annular low friction sealig element 48b such as a nylon or a Teflon ring is disposed between screw 40b and body 16 to sealingly interconnect the end of screw 40b with the area of body 16 surrounding transverse duct 46b to form the primary seal in the valving area of the faucet. Sealing element 48b and screw 40b together form an adjustable sealing element.

A secondary seal such as O-ring 52 may be carried by body 16, as shown in FIG. 5, or in suitable channel in recess 30 for sealingly engaging body 16 with housing 102 somewhere between transverse ducts 46a and b and the primary seal provided by sealing elements 48a and b and the mouth of recess 30 where it surrounds body 16. The angle between the longitudinal axis of transverse duct 46a and transverse duct 46b typically is less than 180° and, for example, as shown in FIGS. 6A–D the angle between the two ducts is approximately 140°.

Figures 6A, 6B, 6C, 6D:
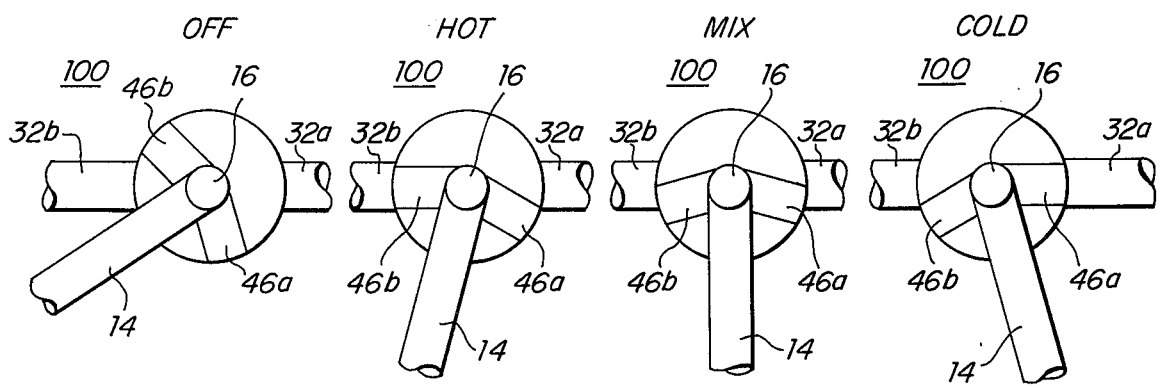
FIGS. 6A, B, C and D are schematic, plan views of the mixer faucet of FIG. 5 shown in the various positions of Off, Hot, Mix and Cold, respectively.

In operation faucet 100 may be turned off by being placed in the position shown in FIG. 6A or in a position rotated 90° counterclockwise from the position shown in FIG. 6A. Faucet 100 may be made to deliver only hot water when placed in the position shown in FIG. 6B; only cold water when placed in the position of FIG. 6D and a mixture of hot and cold water when in the range of positions between those shown in FIGS. 6B and 6D such as shown depicted in FIG. 6C.

Other embodiments will occur to those skilled in the art and are within the following claims:

What is clamed is:

1. A faucet comprising: a spout having a main duct; a housing; a recess in said housing for rotatably receiving the inner end of said spout; said spout being rotatable between at least two positions, a first position and a second position; a first transverse duct in said spout proximate said inner end of said spout and communicating with said main duct of said spout; a first bore in said housing for connection with a first fluid source and extending to said recess and said inner end of said spout; a first adjustable sealing member in said bore; and a first passage extending through said adjustable sealing member to said recess for communicating with said first transverse duct in said first position and not in said second position.

2. The faucet of claim 1 in which said adjustable sealing member includes an adjustable element and a sealing element between said adjustable element and said spout and engageable with said spout to sealingly connect said passage with said transverse duct.

3. The faucet of claim 1 in which said bore includes internal threads and said adjustable sealing member includes external threads engageable with said internal threads.

4. The faucet of claim 1 further includes a pressure pad disposed opposite said bore and bearing on said spout.

5. The faucet of claim 1 further including a second seal member sealingly engaged with said spout and said recess.

6. The faucet of claim 2 in which said adjustable element includes a cam member.

7. The faucet of claim 1 in which said spout has a range of positions between said first and second positions, and said faucet further includes a second transverse duct in said spout proximate said inner end of said spout and communicating with said main duct of said spout; a second bore in said housing for connection with a second fluid source and extending to said recess and said inner end of said spout; a second adjustable sealing member in said second bore; and a second passage extending through said second adjustable sealing member to said recess for communicating with said second transverse duct in said second position but not in said first position, each of said passages partially communicating with their respective transverse ducts in the range of positions.

8. A mixer faucet comprising: a spout, having a main duct, said spout being adjustable between a first position and a second position and having a range of positions between them; a recess in said housing for rotatably receiving the inner end of said spout; a first and a second transverse duct in said spout proximate said inner end of said spout and communicating with said main duct of said spout; a first and a second bore in said housing for connection with first and second fluid sources, respectively, and extending to said recess and said inner end of said spout; a first and a second adjustable sealing member in said first and second bores, respectively; and a first and a second passage extending through said first and second adjustable sealing members, respectively, to said recess; said first passage communicating only with said first transverse duct in said first position of said spout and said second passage communicating only with said second transverse duct in said second position of said spout, and each of said passages communicating partially with their respective said transverse ducts in the range of positions between them.

9. The mixer faucet of claim 8 in which said first and second transverse ducts are disposed at an angle of less than 180° to each other.

* * * * *